United States Patent [19]

Klaessig et al.

[11] 4,255,309
[45] Mar. 10, 1981

[54] POLYACRYLIC ACIDS AND METHYL VINYL ETHER/MALEIC ANHYDRIDE COPOLYMERS AS SOFT SCALE INHIBITORS

[75] Inventors: Frederick C. Klaessig, Doylestown, Pa.; Donald F. Jacques, Kingwood, Tex.

[73] Assignee: Betz Laboratories, Inc., Trevose, Pa.

[21] Appl. No.: 66,953

[22] Filed: Aug. 16, 1979

[51] Int. Cl.³ .............................................. C08L 33/02
[52] U.S. Cl. ........................... 260/29.6 WB; 162/30 R; 162/30 K; 203/7
[58] Field of Search ............ 260/29.6 RW, 29.6 WB, 260/29.6 M; 525/207; 203/7; 162/30 R, 30 K

[56] References Cited

U.S. PATENT DOCUMENTS

| | | | |
|---|---|---|---|
| 3,289,734 | 12/1966 | Robertson | 159/47 |
| 3,293,152 | 12/1966 | Herbert | 203/7 |
| 3,514,376 | 5/1970 | Salutsky | 203/7 |
| 3,516,910 | 6/1970 | Engman | 203/7 |
| 3,715,307 | 2/1973 | Johnson | 203/7 |
| 3,806,485 | 4/1974 | Frisque | 260/29.6 WB |
| 3,867,330 | 2/1975 | Frisque | 260/29.6 WB |

OTHER PUBLICATIONS

B. F. Goodrich, "Good-rite K-700 Polyacrylates for Deposit Control in Water Treatment".

*Primary Examiner*—Paul R. Michl
*Attorney, Agent, or Firm*—Alexander D. Ricci

[57] ABSTRACT

A method is disclosed for inhibiting soft scale precipitation in black liquor systems by adding thereto a treatment comprising in combination polyacrylic acid and methyl vinyl ether/maleic anhydride copolymer.

12 Claims, No Drawings

POLYACRYLIC ACIDS AND METHYL VINYL ETHER/MALEIC ANHYDRIDE COPOLYMERS AS SOFT SCALE INHIBITORS

TECNHICAL FIELD

The kraft process is presently the dominant pulping process in the United States. Besides improved pulp characteristics, a primary factor for this dominance lies in the ability of kraft pulpers to lower chemical costs by maintaining an efficient chemical recovery cycle.

The kraft process recovery cycle consists of several steps in regenerating the cooking liquor (used in the digestion of wood) from the spent liquor. At the blow pit one has a mixture of wood pulp and spent cooking liquor. The spent liquor contains lignin and other wood components dissolved during digestion, and also contains inorganic materials such as sodium sulfate and sodium carbonate. The organic components give the spent cooking liquor a dark color, hence the name black liquor. Black liquor, when separated from the pulp at the washers, has a concentration of about 15% total solids and must be concentrated to about 65% total solids if the liquor is to be efficiently burned in a recovery furnace. Multiple-effect and direct contact evaporators concentrate the liquor to 65% solids at which point the liquor is sprayed into a recovery furnace where further dehydration of the liquor and combustion of the liquor solids occur. Heat is recovered from the lignins and other organic components and, under the extreme temperature conditions found in the recovery furnace, the inorganic sodium sulfate is reduced to sodium sulfide. The inorganic components are recovered as a molten ash (termed smelt) which can be dissolved in water and causticized to give regenerated cooking liquor.

Though each element in the recovery cycle is important to the efficient operation of a kraft pulp mill, the recovery furnace occupies the central position. Recovery furnaces were first developed solely to reclaim the expensive sodium based chemicals, but through updated designs and improved techniques the recovery furnace has become an important source of steam to the pulp mill. Efficient operation of the recovery furnace is critical not only to the recovery cycle, but also to the energy consumption of the kraft pulp mill. For an efficient utilization of the recovery furnace, a maximum amount of residual solids should be recovered from the digester, washers and evaporators.

Multiple-effect evaporators are ordinarily operated by employing the steam produced in the highest pressure evaporator to heat the next highest pressure evaporator. The flow of liquor is counter-current to the flow of steam. The effects of an evaporator train are commonly numbered according to steam flow, thus effect I receives the highest temperature steam and the most concentrated black liquor. Weak black liquor entering the multiple-effect evaporator will range in concentration between 12 and 20% total solids and the strong black liquor leaving the evaporators will range in concentration between 40 and 50% total solids.

Multiple-effect evaporators are most efficient in concentrating black liquor up to about 50% total solids. Although scaling can occur at less than 50% solids, above this value the evaporators are prone to severe scaling, leading to the utilization of direct contact evaporators immediately prior to the recovery furnace.

A common problem which arises with the use of black liquor evaporators is the formation of soft scale (water soluble inorganics) deposits on evaporator surfaces. Soft scale interferes with evaporator operations first by decreasing heat transfer between the steam and black liquor and second by physically blocking evaporator tubes. With severe soft scale fouling, the evaporator must be removed from production and cleaned by a water boil-out.

A combination of literature review, field evidence and laboratory studies has led to the determination that the mineral burkeite, a double salt of sodium sulfate and sodium carbonate, best represents soft scale found in black liquor evaporators.

DESCRIPTION OF THE INVENTION

The present invention is drawn to a method for inhibiting the precipitation of soft scale from an aqueous medium prone to soft scale precipitation. Of course, this method is considered to be particularly useful as it relates to inhibiting soft scale deposit formation on surfaces of multiple-effect black liquor evaporators and will, accordingly, be described herein as it relates to that environment.

According to the present invention, the formation of soft scale deposits in black liquor evaporators is inhibited by adding to the black liquor an effective amount for the purpose of a treatment comprising in combination copolymer of methyl vinyl ether and maleic anhydride or the equivalent maleic acid (MVE/MA) and polyacrylic acid (PAA) or water soluble salt thereof.

THE COPOLYMER

MVE/MA copolymers are well known as are methods for preparing them, as evidenced by the "Encyclopedia of Polymer Science and Technology", Volume 14, John Wiley & Sons, Inc., Library of Congress Catalog Card Number: 64-22188, 1971. This reference is incorporated herein by reference. According to this work, the copolymer can be prepared by bulk polymerization of maleic anhydride with methyl vinyl ether using benzoyl peroxide as initiator at 40°–100° C. It is also stated that several grades of the copolymer are available ranging in specific viscosity (1 g/dl at 25° C. in ethyl methyl ketone) from 0.1 to 3.5. It is known that vinyl ethers copolymerize readily with maleic anhydride to form alternating copolymers and that neither monomer readily homopolymerizes under the conditions of copolymerization. Accordingly, it is believed that using presently available technology only MVE/MA copolymers having a mole ratio of 1:1 are readily achievable. On this basis, a mole ratio of about 1:1 is considered to be preferred. According to the manufacturer of the MVE/MA copolymers tested, with most solvents, copolymer molecules appear to associate in solution, leading to high apparent molecular weights. Thus, when molecular weights are determined, different values may be obtained, depending on the extent of association in the solutions. The apparent number-average molecular weights for three samples, measured by membrane osmometry (600-D membranes) in 2-butanone, with solution concentrations ranging from 1 to 10 grams of sample per 1000 ml. of solution ranged from about 20,000 g/mole to about 67,000 g/mole. Since copolymers representative of the whole molecular weight range were tested and compared favorably with a known black liquor soft scale inhibitor, the successful use of a soft scale treatment method according to the present invention is not believed to be molecular weight-dependent with respect to the copolymer. However, copolymer with the lowest apparent average molecular weight (20,000 g/mole) is preferred.

THE POLYACRYLIC ACID

Acrylic acid polymers are well known as are methods for preparing them, as evidenced by the "Encyclopedia of Polymer Science and Technology", Volume 1, John Wiley & Sons, Inc., Library of Congress Catalog Card Number 64-22188, 1971, pp. 197-204. This work is incorporated herein by reference. Since polymers representative of a broad spectrum of molecular weights were tested and demonstrated efficacy, successful use of a soft scale treatment according to the present invention is not believed to be particularly molecular weight-dependent with respect to the PAA. In any event, it is believed that the lower limit would be about 500. The preferred lower molecular weight limit is about 1,500 with the most preferred lower limit being about 5,000. As long as the polyacrylic acid is water-soluble, it should be efficacious for the purpose. Based on this consideration, the molecular weight could be as high as about 1,000,000 with about 100,000 being the most preferred upper limit. As noted above, the acid or water-soluble salt form of the polymer would be effective. Examples of polyacrylic acid salts would be sodium, ammonium or potassium salts. Any reference herein to polyacrylic acid is, accordingly, intended to include the water-soluble salts.

Depending on the nature and severity of the particular problem being treated, the amount of active treatment added could vary over a wide range. Active dosages could be as low as about one part treatment per million parts of black liquor, based on weak liquor flow. About 25 parts per million is the preferred minimum, with about 50 parts per million being most preferred. On the other hand, active dosages could be as high as about 500 parts per million. About 350 parts per million is the preferred maximum, with about 300 parts per million being most preferred.

Relative proportions of the components used in practicing a method according to the present invention are not seen to be critical. In any event, the weight ratio of PAA to MVE/MA copolymer should be from about 5:95 to 95:5. A weight ratio of about 20:80 to 80:20 is preferred; while about 30:70 to 70:30 is most preferred.

EXAMPLE 1

According to U.S. Pat. No. 3,516,910 to Engman et al, sodium polymethacrylate is an effective soft scale deposit inhibitor in black liquor evaporators. A comparison of this material with MVE/MA copolymer was provided using the following test procedure:

Materials:
  29.92 g sodium carbonate
  11.08 g sodium sulfate
  100.0 g DD water
  0.7 ml treatment (1% active)

(1) Dissolve materials in 250 ml Erlenmeyer flask.
(2) Heat to approximately 90° C. and maintain temperature for one hour.
(3) Add 10 g sodium chloride.
(4) Agitate manually upon addition of the salt, after 20 minutes and 40 minutes, otherwise gyratory action of water bath shaker should be used.
(5) Filter.
(6) Dry precipitate overnight and weigh.

The precipitate formed in this test was burkeite which, as noted above, is considered to be the predominant constituent of soft scale. Burkeite is the double salt of sodium sulfate and sodium carbonate. In the test (as in all reported burkeite tests), the molar ratio of sodium sulfate to sodium carbonate in solution was chosen to be 0.28, which conforms to the average molar ratio of 28 kraft mill black liquor samples analyzed and reported by T. M. Grace et al, TAPPI Conference Papers, "Alkaline Pulping and Testing", Sept. 13-15, 1976, Dallas, TX, pp. 85-89.

The comparative results are reported below in Table 1 in terms of grams of precipitate remaining after treatment. Since the test conditions are considered to be rather harsh, the results are seen to be inconclusive concerning the inhibition efficacy of each material as compared to control ($8\pm1$ g). However, comparative results are, nonetheless, considered to be valid.

The MVE/MA copolymers tested (in all tests reported herein) were GANTREZ polymers sold by GAF Corporation. Molecular weights reported are apparent number-average molecular weights as described above. The unknown molecular weight reported was assumed to be greater than 41,000 but less than 67,000. The sodium polymethacrylates tested were obtained from two different suppliers.

TABLE 1

COMPARISON OF MVE/MA COPOLYMERS WITH SODIUM POLYMETHACRYLATE
Treatment Dosages = 50 ppm actives

| Treatment | Weight Precipitate (g) |
| --- | --- |
| Sodium Polymethacrylate I | 8.1 |
| MVE/MA (M.W. = 20,000) | 6.6 |
| MVE/MA (M.W. = unknown) | 6.3 |
| MVE/MA (M.W. = 67,000) | 7.5 |
| MVE/MA (M.W. = 41,000) | 8.1 |
| Sodium Polymethacrylate II | 9.6 |

As a whole, the MVE/MA copolymers compared favorably with the sodium polymethacrylate which, as already noted, is disclosed in the prior art as a soft scale inhibitor for black liquor evaporators.

EXAMPLE 2

Tests were conducted to determine the efficacy of MVE/MA copolymers as soft scale precipitation inhibitors using a testing procedure as follows:

Materials:
  29.92 g sodium carbonate
  11.08 g sodium sulfate
  100 g DD water
  10 g sodium chloride (1) Dissolve sodium carbonate and sodium sulfate in water in a 250 ml Erlenmeyer flask.
(2) Add 10 g sodium chloride and dissolve.
(3) Add treatment.
(4) Lightly stopper flask, place in gyratory bath at 90° C. and heat for 3 hours.
(5) Filter.
(6) Dry burkeite precipitate overnight at 105° C. and weigh.

The results of these tests are reported below in Table 2 in terms of weight of precipitate remaining after treatment and percent (%) inhibition as compared to a no-treatment control in which $7.7\pm1.3$ g of precipitate formed. Treatment levels were all 200 ppm actives. The conditions of these tests were not considered to be as harsh as those reported in Example 1 such that the results in Table 2 are considered to more accurately reflect soft scale inhibition efficacy.

TABLE 2
SOFT SCALE INHIBITION EFFICACY OF MVE/MA COPOLYMERS

| Treatment | Weight Precipitate | % Inhibition |
|---|---|---|
| MVE/MA (M.W. = 20,000) | 0.6 | 92 |
| MVE/MA (M.W. between 41,000 and 67,000) | 2.3 | 70 |

Indeed, the copolymers reported in Table 2 were seen to demonstrate significant soft scale inhibition efficacy.

EXAMPLE 3

Soft scale inhibition of MVE/MA copolymer as a function of treatment level was also studied using the procedure described in Example 2. The copolymer tested had an apparent number-average molecular weight of 20,000 g/mole. The results of this test are reported below in Table 3 in terms of weight of precipitate remaining after treatment and percent (%) inhibition as compared to a no-treatment control. The control yielded 7.7±1.3 g of precipitate.

TABLE 3
SOFT SCALE INHIBITION AS FUNCTION OF TREATMENT LEVEL

| Treatment Dosage (active ppm) | Weight Precipitate (g) | % Inhibition |
|---|---|---|
| 7 | 6.5 | 16 |
| 30 | 4.6 | 40 |
| 50 | 3.9 | 49 |
| 100 | 1.0 | 87 |
| 125 | 2.0 | 74 |
| 150 | 0.9 | 88 |
| 175 | 1.7 | 78 |
| 200 | 0.6 | 92 |
| 275 | 0.6 | 92 |
| 300 | 0.4 | 95 |

EXAMPLE 4

As already noted, the predominant constituent of soft scale is considered to be burkeite, a double salt of sodium sulfate and sodium carbonate. Burkeite might best be represented by the chemical formula $2NaSO_4 \cdot Na_2CO_3$. Due to variations in soft scale compositions, it is believed that other possible minor constituents of soft scale are thermonatrite, $Na_2CO_3 \cdot H_2O$, and thenardite ($Na_2SO_4$). Accordingly, copolymer according to the present invention was tested for inhibition efficacy against these possible constituents.

The procedure for the thermonatrite test was as follows:

Materials:
35 g sodium carbonate
12 g sodium chloride
100 g DD water (1) Dissolve sodium carbonate in DD water in 250 ml Erlenmeyer flask.
(2) Dissolve sodium chloride in above solution.
(3) Add treatment.
(4) Stopper flask and place in gyratory bath at 90° C. for 3 hours.
(5) Filter precipitate and dry overnight at 105° C.
(6) Weigh dried precipitate and calculate % inhibition (dried weight × 1.18 = $Na_2CO_3 \cdot H_2O$ weight).

The thenardite inhibition test procedure was as follows:

Materials:
30 g sodium sulfate
12 g sodium chloride
100 g DD water (1) Dissolve sodium sulfate into DD water in 250 ml Erlenmeyer flask.
(2) Dissolve sodium chloride into above solution.
(3) Add treatment.
(4) Adjust pH to 11.5.
(5) Stopper flask and place in gyratory bath at 90° C. for 3 hours.
(6) Filter precipitate and dry overnight at 105° C.
(7) Weigh dried precipitate and calculate % inhibition.

The results of these tests are reported below in Table 4 in terms of percent (%) inhibition as compared to a control. The MVE/MA copolymer tested was one having an apparent number-average molecular weight, as described above, of 20,000 g/mole; and the treatment level was 200 parts per million.

TABLE 4
INHIBITION OF THERMONATRITE AND THENARDITE WITH MVE/MA COPOLYMER

| Precipitate | % Inhibition |
|---|---|
| Thermonatrite | 93 |
| Thenardite | 95 |

As can be seen from Table 4, the copolymer tested was effective against the tested soft scale constituents.

EXAMPLE 5

Other chemical species found in black liquor are solid calcium carbonate and fatty acids. Accordingly, these species were added to the burkeite system of Example 2 and tested for their effect on the burkeite inhibition efficacy of MVE/MA copolymer. Also, a sample of black liquor was obtained and tested in a similar burkeite system.

It has been determined that solid calcium carbonate is found in kraft black liquor in amounts less than 450 parts per million. However, an extremely high level of calcium carbonate, about 6500 parts per million, was used in the test system (1 gram solid calcium carbonate was added).

Similarly, in a separate test, 1 gram of fatty acid salt mixture was added to the burkeite system. This mixture comprised 0.5 gram sodium oleate and 0.5 gram sodium stearate. The level of fatty acid in the test system was 6500 parts per million, which is considered to be a high level also.

In a third test, 1 gram of an industrial black liquor sample was added to a burkeite system as described in Example 2. Since the system, before addition of black liquor, was already supersaturated with burkeite, the conditions of the third test were also considered to be quite severe.

Results of the soft scale inhibition tests in the presence of solid calcium carbonate, fatty acids and black liquor are presented below in terms of percent (%) inhibition versus a control run. The treatment levels were all 200 parts per million, and the MVE/MA copolymer tested was the same as described in Example 4.

TABLE 5

| Constituent Added to Burkeite System | % Inhibition |
| --- | --- |
| Black liquor | 56 |
| Fatty acid | 50 |
| Solid calcium carbonate | 29 |

As can be seen from Table 5, while the copolymer was tested under unusually severe conditions, it still demonstrated soft scale inhibition efficacy. In view of the test conditions, this efficacy was considered to be quite impressive.

EXAMPLE 6

As already noted above, according to U.S. Pat. No. 3,516,910 to Engman et al, substituted polyacrylates are effective soft scale deposit inhibitors in black liquor evaporators as allegedly demonstrated by testing sodium polymethacrylate. A comparison of these materials (as represented by sodium polymethacrylate) with the unsubstituted form of polyacrylic acid according to the present invention was provided using the same test procedure outlined in Example 1.

The comparative results are reported below in Table 6 in terms of grams of precipitate remaining after treatment. As noted in Example 1, since the test conditions are considered to be rather harsh, the results are seen to be inconclusive concerning the inhibition efficacy of each material as compared to control ($8 \pm 1$ g). However, comparative results are, nonetheless, considered to be valid.

The polyacrylic acids tested were Good-rite polymers available from B. F. Goodrich and had reported molecular weights as indicated parenthetically. The sodium polymethacrylates tested were the same as used in Example 1. Treatment dosages were 50 parts per million (actives).

TABLE 6
COMPARISON OF POLYACRYLIC ACIDS WITH SUBSTITUTED POLYACRYLATES

| Treatment | Weight Precipitate (g) |
| --- | --- |
| Sodium Polymethacrylate I | 8.1 |
| Sodium Polymethacrylate II | 9.6 |
| Polyacrylic Acid (M.W. = 100,000) | 7.1 |
| Polyacrylic Acid (M.W. = 5,000) | 6.6 |
| polyacrylic Acid (M.W. = 1,500) | 8.2 |

As a whole, the polyacrylic acids compared favorably with the sodium polymethacrylate which, as already noted, is disclosed in the prior art as a soft scale inhibitor for black liquor evaporators.

EXAMPLE 7

Tests were conducted to determine the efficacy of polyacrylic acid and other known general dispersants as soft scale precipitation inhibitors using the same testing procedure outlined in Example 2.

Results of these tests are reported below in Table 7 in terms of weight of precipitate remaining after treatment and percent (%) inhibition as compared to a no-treatment control in which $7.7 \pm 1.3$ g of precipitate formed. Treatment levels were all 200 ppm actives. The conditions of these tests were not considered to be as harsh as those reported in Example 6 such that the results in Table 7 are considered to more accurately reflect soft scale inhibition efficacy. The other known general dispersants tested were a sulfonated polyfunctional oligomer and an alkylaryl polyethylene glycol ether (both commercially available).

TABLE 7
SOFT SCALE INHIBITION EFFICACY OF POLYACRYLIC ACID POLYMERS AND OTHER KNOWN GENERAL DISPERSANTS

| Treatment | Weight Precipitate | % Inhibition |
| --- | --- | --- |
| PAA (M.W. = 100,000) | 1.6 | 79 |
| PAA (M.W. = 5,000) | 0.4 | 95 |
| PAA (M.W. = 1,500) | 1.7 | 78 |
| Oligomeric Dispersant | 5.5 | 29 |
| Glycol Ether Dispersant | 6.5 | 16 |

Indeed, the PAA's reported in Table 7 were seen to demonstrate significant soft scale inhibition efficacy. On the other hand, despite the fact that the other compounds tested are known as general dispersants, they failed to inhibit soft scale precipitation.

EXAMPLE 8

Soft scale inhibition of PAA as a function of treatment level was also studied using the procedure described in Example 2.

The results of this test are reported below in Table 8 in terms of weight of precipitate remaining after treatment and percent (%) inhibition as compared to a no-treatment control. The control yielded $7.7 \pm 1.3$ g of precipitate.

TABLE 8
SOFT SCALE INHIBITION AS FUNCTION OF TREATMENT LEVEL

| Treatment | Dosage (active ppm) | Weight Precipitate (g) | % Inhibition |
| --- | --- | --- | --- |
| PAA (M.W. = 100,000) | 10 | 4.6 | 40 |
|  | 25 | 3.4 | 56 |
|  | 50 | 2.3 | 70 |
|  | 100 | 0.3 | 96 |
| PAA (M.W. = 5,000) | 10 | 4.9 | 36 |
|  | 50 | 4.3 | 44 |
|  | 100 | 4.5 | 42 |
|  | 150 | 2.2 | 71 |
|  | 200 | 0.4 | 95 |
| PAA (M.W. = 1,500) | 10 | 7.7 | 0 |
|  | 50 | 7.0 | 9 |
|  | 100 | 6.6 | 14 |
|  | 200 | 1.7 | 78 |

EXAMPLE 9

As already noted, due to variations in soft scale compositions, it is believed that other possible minor constituents of soft scale are thermonatrite, $Na_2CO_3 \cdot H_2O$ and thenardite ($Na_2SO_4$). Accordingly, PAA was tested for inhibition efficacy against these possible constituents using the same procedures outlined above in Example 4.

The results of these tests are reported below in Table 9 in terms of percent (%) inhibition as compared to a control. Treatment levels were 200 parts per million.

TABLE 9
INHIBITION OF THERMONATRITE AND THENARDITE WITH POLYACRYLIC ACID

| Precipitate | Treatment | % Inhibition |
| --- | --- | --- |
| Thermonatrite | PAA (M.W. = 5,000) | 93 |
|  | PAA (M.W. = 100,000) | 98 |
|  | PAA (M.W. = 1,500) | 93 |
| Thenardite | PAA (M.W. = 5,000) | 70 |
|  | PAA (M.W. = 100,000) | 16 |

TABLE 9-continued

INHIBITION OF THERMONATRITE
AND THENARDITE WITH
POLYACRYLIC ACID

| Precipitate | Treatment | % Inhibition |
|---|---|---|
| | PAA (M.W. = 1,500) | 42 |

EXAMPLE 10

Other chemical species found in black liquor are solid calcium carbonate and fatty acids. Accordingly, these species were added to the burkeite system of Example 2 and tested for their effect on the burkeite inhibition efficacy of PAA. Also, a sample of black liquor was obtained and tested in a similar burkeite system. The test procedures were the same as outlined above in Example 5.

Results of the soft scale inhibition test in the presence of solid calcium carbonate, fatty acids and black liquor are presented below in terms of percent (%) inhibition versus a control run. The treatment levels were all 200 parts per million.

TABLE 10

| Constituent Added to Burkeite System | Treatment | % Inhibition |
|---|---|---|
| Black liquor | PAA (M.W. = 1,500) | 18 |
| | PAA (M.W. = 5,000) | 51 |
| | PAA (M.W. = 100,000) | 90 |
| Fatty acid | PAA (M.W. = 1,500) | 60 |
| | PAA (M.W. = 5,000) | 76 |
| | PAA (M.W. = 100,000) | 52 |
| Solid Calcium Carbonate | PAA (M.W. = 1,500) | 36 |
| | PAA (M.W. = 5,000) | 23 |
| | PAA (M.W. = 100,000) | 35 |

As can be seen from Table 10, while the polymer was tested under unusually severe conditions, it still demonstrated soft scale inhibition efficacy. In view of the test conditions, this efficacy was considered to be quite impressive.

Having thus established this efficacy, individually, of MVE/MA copolymer and PAA polymer as soft scale precipitation inhibitors, the efficacy of combined treatments was evaluated. Indeed, it is considered highly desirable to be able to combine the individual additives on an optimized cost basis. Also, depending on the particular problem to be treated, it may be desirable to combine the additives to take advantage of the respective strengths of each and/or to possibly supplement the relative weaknesses of each. For example, with respect to the latter point, while the MVE/MA copolymer demonstrated substantial inhibition efficacy for the gamut of possible soft scale constituents, the PAA polymer was superior in the presence of high levels of fatty acids.

For testing in a first test, a combined treatment was made according to the following method:
1. Combine the components in approximately 60 grams of tap water.
2. Add 50% NaOH to a pH near 13.0–13.5 while stirring.
3. Dilute to 100 total grams while stirring.
4. Continue stirring until dissolution is complete.

The products tested had the following compositions of active MVE/MA and PAA:
Product I:
 10% PAA (M.W.=5,000)
 3% MVE/MA (M.W.=20,000)
Product II:
 4% PAA (M.W.=100,000)
 6.5% MVE/MA (M.W.=20,000)

EXAMPLE 11

A soft scale inhibition test as described in Example 2 above was used to evaluate these products, and the results are reported below in Table 11 in terms of percent (%) inhibition at the treatment levels indicated.

TABLE 11

SOFT SCALE INHIBITION
OF COMBINED MVE/MA-PAA
TREATMENTS

| Treatment | Dosage (ppm actives) | % Inhibition |
|---|---|---|
| Product I | 7 | 23 |
| | 17 | 48 |
| | 43 | 57 |
| Product II | 5 | 26 |
| | 14 | 40 |
| | 35 | 62 |

Confirming field tests were conducted in a black liquor evaporator set of a well known paper company. While no actual deposit samples were obtained to verify the nature of the deposits in the evaporator set, the operating history was consistent with soft scaling since higher liquor flow rates were attained after water boil-outs.

The product tested was similar to Product I described in the preceding example, and it was fed into the return line from the soap skimmer and immediately prior to the next effect of the evaporator train. This allowed treatment to be fed close to the expected scaling locations (i.e., the hotter effects), minimized the potential loss of active components within the soap skimmer and prevented the possibility of interference with or from the soap skimmer operation (e.g., fatty acids). Treatment dosages were 64 parts of treatment per million parts of black liquor based on weak liquor flow.

Results in this test are reported below in Table 12 in terms of length of time in days between required boil-outs. Of course, the longer the period between boil-outs, the greater the efficacy of the treatment is considered to be.

TABLE 12

EFFECT OF COMBINED MVE/MA
COPOLYMER-PAA TREATMENT ON
BLACK LIQUOR EVAPORATOR BOIL-OUT FREQUENCY

| Boil-Out Date | Treatment Dosage (ppm) | Date Treatment Commenced | Date Treatment Stopped | Length of Boil-Out (Hours) | Run Time Between Boil-Outs (Days) |
|---|---|---|---|---|---|
| 10/10/78 | None | — | — | 12 | 7 |
| 10/19/78 | None | — | — | 14 | 9 |
| 10/23/78 | None | — | — | 12 | 4 |
| 12/2/78 | None | — | — | — | 10 |
| 12/27/78 | None | — | — | 14 | —* |
| 1/19/79 | 64 ppm | 12/29/78 | 1/19/79 | 8 | 21 |
| 2/3/79 | 64 ppm | 1/19/79 | 1/26/79** | 4 | 16 |

*Christmas shutdown 12/2/78–12/27/78, boil-out performed 12/27/78.
**Treatment ran out after 8 days.

These results are considered to be dramatic. Indeed, very significant improvements were obtained during treatment, with 21 days between boil-outs being realized after initial feed. The subsequent 16 day run time between boil-outs involved only an eight day treatment period, after which time the treatment ran out. These extended run times were significantly higher than typical run times between boil-outs during the baseline periods for the test, even though many boil-outs were dictated by opportunity rather than by need.

A preferred combined treatment composition would be comprised (by weight) as follows:

PAA (M.W.=5,000): 10%
MVE/MA (M.W.=20,000): 3%
NaOH (50%): 13.5%
Water: 73.5%

To mitigate possible negative effects of fatty acid on the treatment, it is recommended that it be fed to black liquor after the soap skimmer. Also, it is preferred that the treatment be added as an aqueous solution.

Having thus described our invention, we claim:

1. A method for inhibiting the precipitation of soft scale from black liquor, which method comprises adding to said black liquor an effective amount for the purpose of a treatment comprising in combination effective polyacrylic acid and effective methyl vinyl ether/maleic anhydride copolymer, wherein said treatment is added in an amount of from about 1 to about 500 parts per million parts of black liquor.

2. A method according to claim 1, wherein said soft scale comprises burkeite.

3. A method for inhibiting the precipitation of soft scale from black liquor in a multiple-effect evaporator, which method comprises adding to said black liquor an effective amount for the purpose of a treatment comprising in combination effective polyacrylic acid and effective methyl vinyl ether/maleic anhydride copolymer, wherein said treatment is added in an amount of from about 1 to about 500 parts per million parts of black liquor and wherein said soft scale comprises burkeite.

4. A method according to claim 1, wherein said polyacrylic acid has a molecular weight of from about 500 to 1,000,000.

5. A method according to claim 4, wherein said copolymer has an apparent number-average molecular weight of from about 20,000 to about 67,000.

6. A method according to claim 5, wherein said copolymer has a mole ratio of methyl vinyl ether to maleic anhydride of about 1:1.

7. A method according to claim 4, 5 or 6, wherein said polyacrylic acid has a molecular weight of from about 1,500 to about 100,000.

8. A method according to claim 4, 5 or 6, wherein said soft scale further comprises thermonatrite and thenardite.

9. A method according to claim 7, wherein said polyacrylic acid has a molecular weight of from about 5,000 to about 100,000.

10. A method according to claim 3, wherein the relative proportion of said polyacrylic acid to said methyl vinyl ether/maleic anhydride copolymer is from about 5:95 to about 95:5.

11. A method according to claim 10, wherein said treatment comprises on a weight basis:

Polyacrylic acid—10%
Methyl vinyl ether/maleic anhydride copolymer—3%
50% NaOH—13.5%
Water—73.5%

12. A method according to claim 11, wherein said polyacrylic acid has a molecular weight of about 5,000 and said copolymer has an apparent number-average molecular weight of about 20,000.

* * * * *